(12) United States Patent
Kumazawa et al.

(10) Patent No.: US 6,333,697 B1
(45) Date of Patent: Dec. 25, 2001

(54) COMPOSITE OPERATIONAL DISPLAY UNIT FOR VEHICLE INSTRUMENT PANEL

(75) Inventors: Katsuhiro Kumazawa, Anjo; Hiroshi Tominaga, Okazaki, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/593,965

(22) Filed: Jun. 15, 2000

(30) Foreign Application Priority Data

Jul. 14, 1999 (JP) .................................................. 11-200676

(51) Int. Cl.[7] ...................................................... G08B 5/00
(52) U.S. Cl. ................... 340/815.4; 340/815.47; 340/815.49; 340/461; 340/458; 340/980
(58) Field of Search .................... 340/441, 461, 340/458, 815.4, 931, 980, 716, 784

(56) References Cited

FOREIGN PATENT DOCUMENTS

| | | |
|---|---|---|
| 19732156 | 1/1998 | (DE) . |
| 19757545 | 6/1998 | (DE) . |
| 2266375 | 10/1993 | (GB) . |
| 10-91076 | 4/1998 | (JP) .................................. 340/815.4 |

*Primary Examiner*—Jeffery Hofsass
*Assistant Examiner*—Hung Nguyen
(74) *Attorney, Agent, or Firm*—Law Office of David G. Posz

(57) ABSTRACT

A combination meter for a vehicle has a speedometer, a tachometer, a gauge and a warning light disposed in a casing. A holding panel having an annular wall and a rear wall is attached to the casing so that the speedometer, the tachometer, the gauge and the warning light are exposed through openings formed in the rear wall. The speedometer analog-displays a speed of the vehicle using a dial and a pointer and digital-displays a speed of the vehicle using an EL panel disposed at a front side of the dial and attached to the holding panel. An EL drive circuit for driving the EL panel is mounted on an outer surface of the annular wall of the holding panel. As a result, the EL panel and the EL drive circuit are readily attached to the casing simultaneously when the holding panel is attached to the casing, thereby improving an efficiency in attachment and replacement of the EL panel and the EL drive circuit.

12 Claims, 8 Drawing Sheets

US 6,333,697 B1

COMPOSITE OPERATIONAL DISPLAY UNIT FOR VEHICLE INSTRUMENT PANEL

CROSS REFERENCE TO RELATED APPLICATIONS

This application relates to and claims priority from Japanese Patent Application No. 11-200676 filed on Jul. 14, 1999, the contents of which are hereby incorporated by reference.

BACKGROUND OF THE INVENTION

1. Field of the Invention

The present invention relates generally to displays, and particularly to a composite operational display unit of a vehicle instrument panel having plural operational displays.

2. Related Art

JP-A-10-91076 discloses a composite operational display unit having a first operational display and a second operational display. The second operational display is a transparent electroluminescent (EL) display and is disposed at a front side of the first operational display. However, in addition to the first and second operational displays, the composite operational display unit needs to have two drive circuits for respectively driving the first and second operational displays, while a mounting space of the composite operational display unit in a vehicle has been demanded to be reduced. Therefore, it is required to improve an efficiency in attachment and replacement of the first and second operational displays and the drive circuits in the display unit.

SUMMARY OF THE INVENTION

In view of the foregoing problems, it is an object of the present invention to provide a composite operational display unit in which an efficiency in attachment and replacement of plural operational displays and drive units is improved.

According to the present invention, a composite operational display unit has a first operational display and a second operational display disposed at a front side of the first operational display. An annular holding panel having a rear opening is attached to the second operational display from a front side of the second operational display so that the second operational display is disposed opposite the rear opening. A drive unit which drives the second operational display is mounted on an outer surface of the holding panel. The first operational display is visible through the second operational display. Since the drive unit is mounted on the outer surface of the holding panel, the drive unit is readily attached to the display unit simultaneously when the holding panel is attached to the display unit. Therefore, an efficiency in attachment and replacement of the drive unit is improved.

Preferably, the holding panel has a front end forming a front opening, and the front end is formed to extend obliquely with respect to the rear opening so that the holding panel has a larger-width portion having a larger width in a front-rear direction. The drive unit is mounted on an outer surface of the larger-width portion. As a result, the drive unit is efficiently attached to the display unit while making good use of a shape of the holding panel. Therefore, a mounting space of the display unit is restricted from largely increasing.

More preferably, the second operational display is attached to the holding panel, and the drive unit is mounted to the outer surface of the holding panel, before the holding panel is attached to a casing which accommodates the first and second operational displays therein. As a result, the drive unit and the second operational display are readily attached to the casing simultaneously when the holding panel is attached to the casing. Therefore, an efficiency in attachment and replacement of the drive unit and the second operational display is improved.

BRIEF DESCRIPTION OF THE DRAWINGS

This and other objects and features of the present invention will become more readily apparent from a better understanding of the preferred embodiment described below with reference to the accompanying drawings, in which.

DETAILED DESCRIPTION OF THE PREFERRED EMBODIMENT

A preferred embodiment of the present invention is described hereinafter with reference to the accompanying drawings. In the present embodiment, the present invention is applied to a combination meter for a vehicle as a composite operational display unit having plural operational displays.

Figure 1:
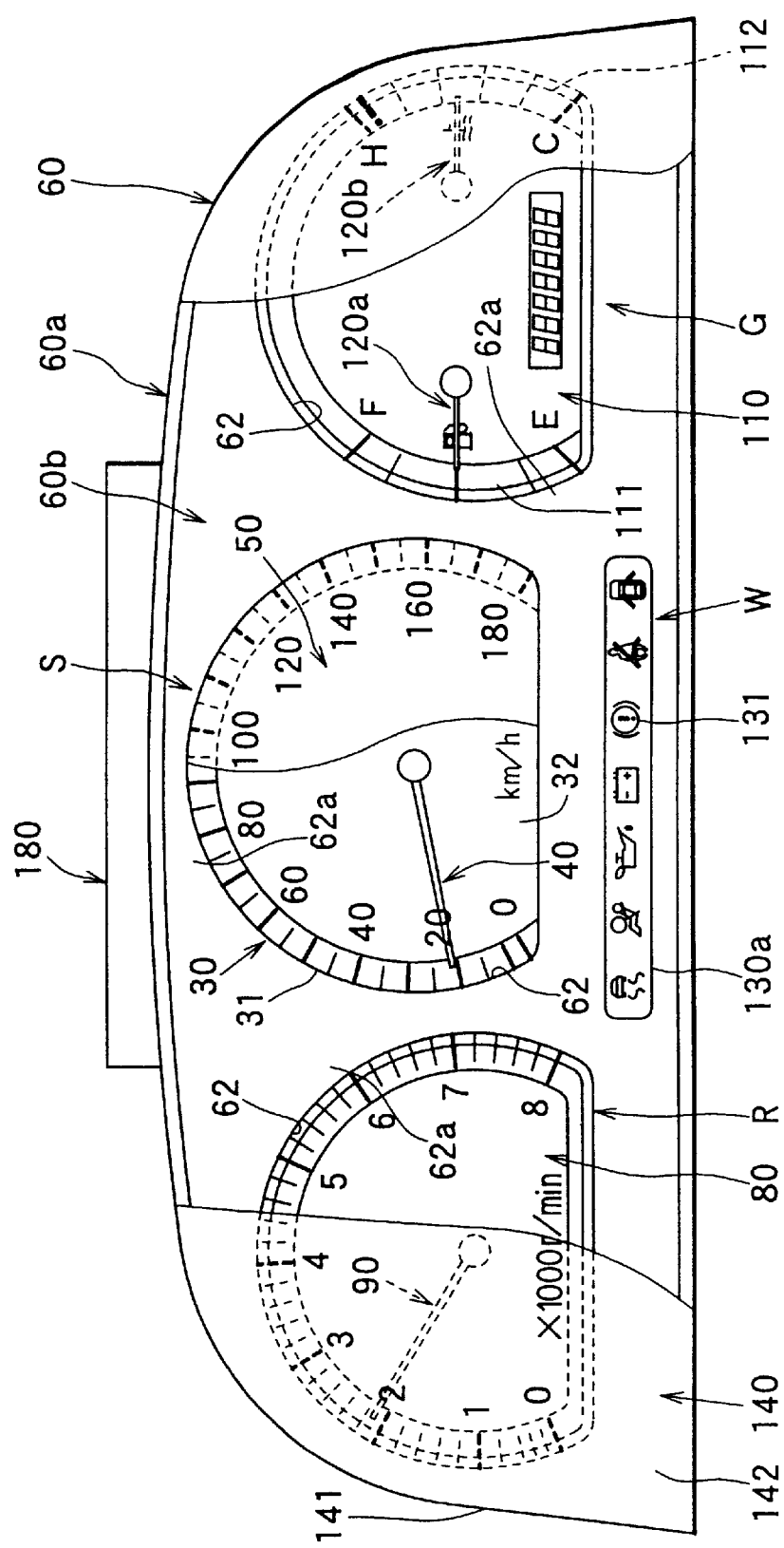
FIG. 1 is a cutaway front view showing a combination meter for a vehicle according to a preferred embodiment of the present invention.
Figure 2:
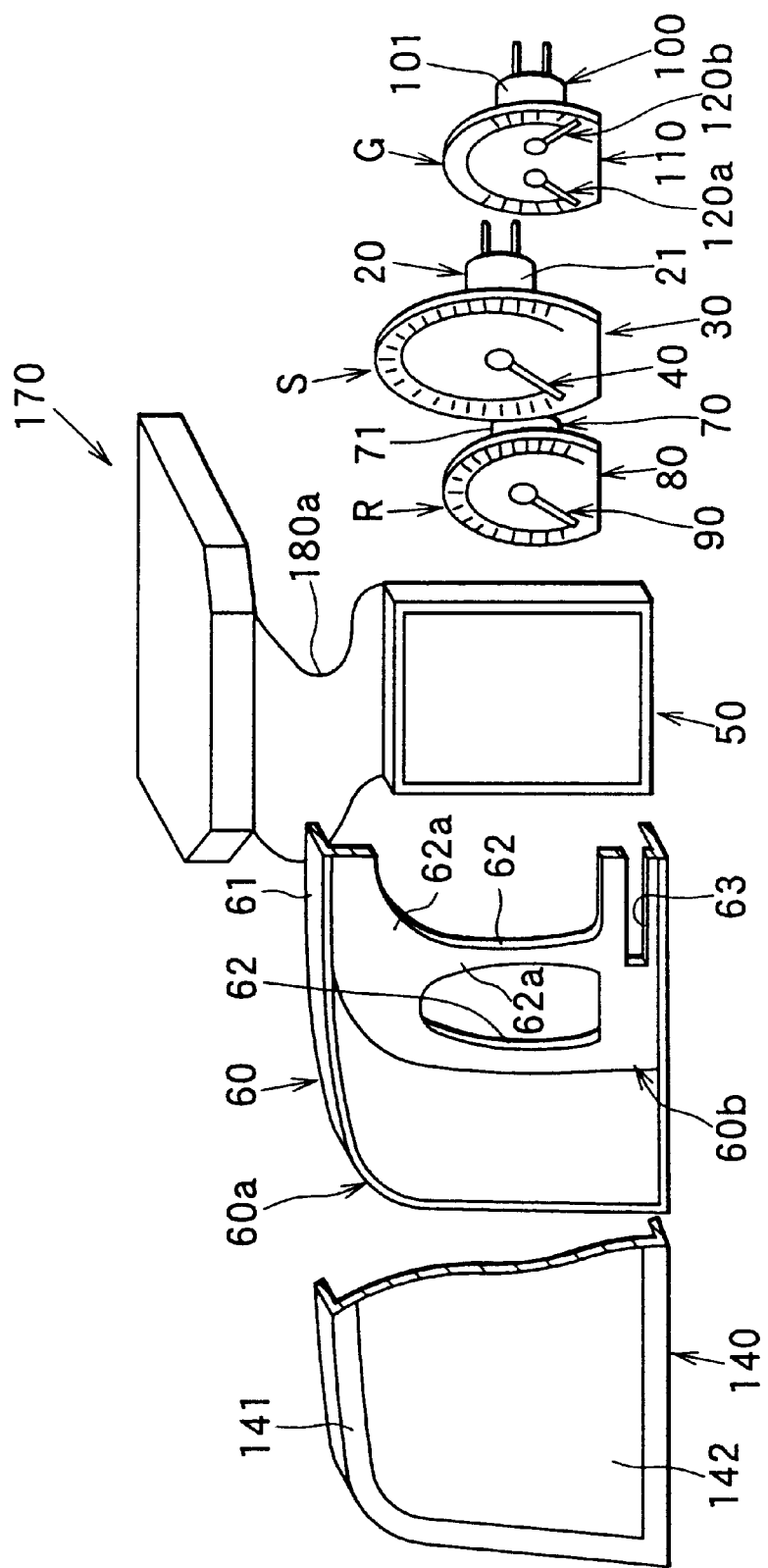
FIG. 2 is an exploded cutaway perspective view showing the combination meter according to the embodiment.
Figure 3:
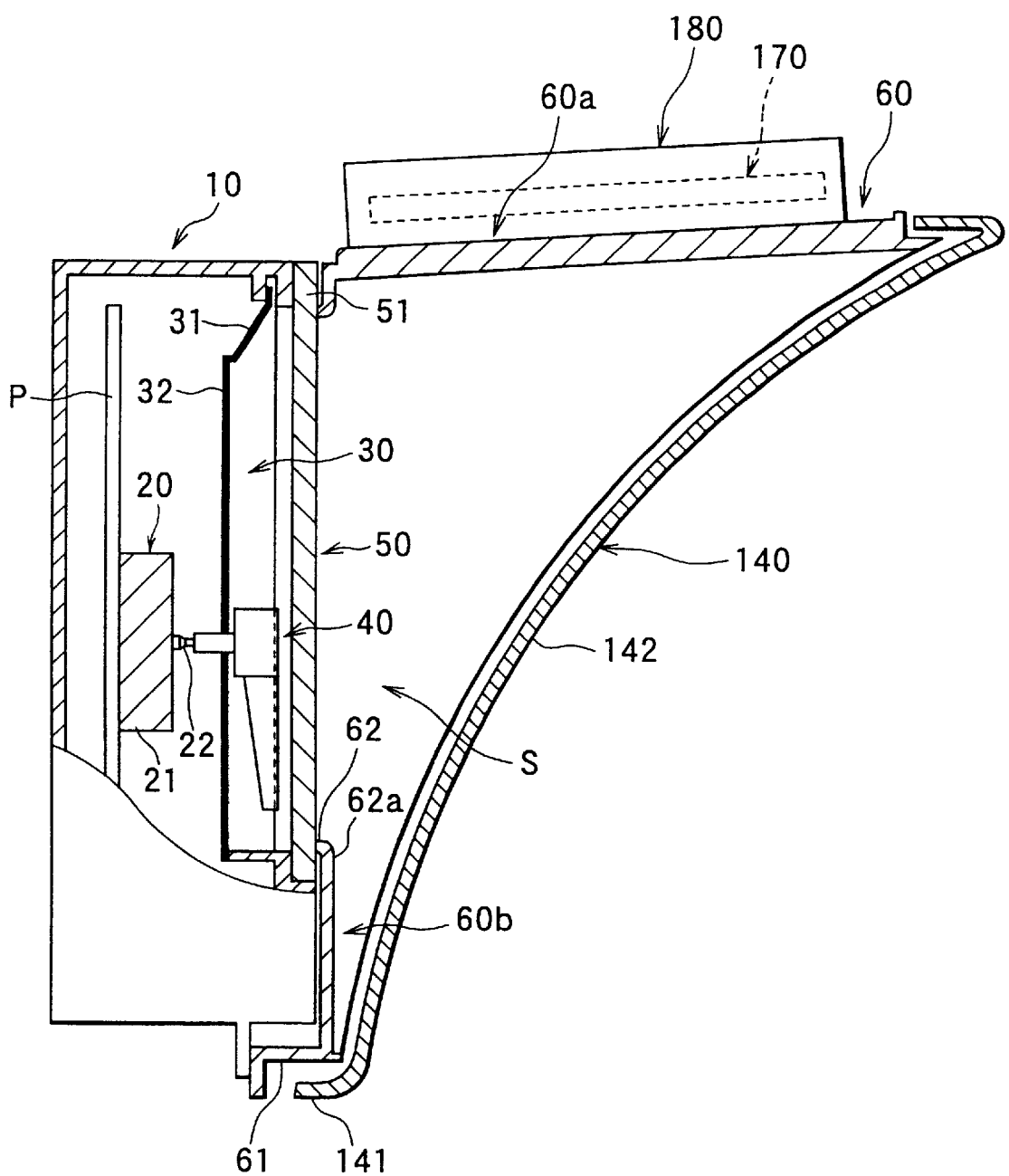
FIG. 3 is a cutaway side view showing the combination meter according to the embodiment.

As shown in FIG. 1, the combination meter has a speedometer S, a tachometer R, a gauge G and a warning light W all of which are disposed in a casing 10 in FIG. 3. As shown in FIG. 2, the speedometer S has a drive unit 20. As shown in FIG. 3, the drive unit 20 has a unit body 21 attached to a panel P and a pointer shaft 22. The pointer shaft 22 protrudes from a front surface of the unit body 21 and is rotatably held by the unit body 21. The speedometer S also has a dial 30 and a pointer 40. The dial 30 is held in the casing 10 at an immediately front side of the unit body 21. As shown in FIG. 1, the dial 30 has an arc-shaped scale portion 31 and a center portion 32. As shown in FIG. 3, the scale portion 31 is formed to obliquely extend from the center portion 32 toward a front side. Light emitted from a cold cathode tube (not shown) held in the casing 10 enters the dial 30 through a light transmitting plate (not shown) disposed along a rear side of the dial 30 so that the dial 30 is illuminated.

The pointer shaft 22 extends through a hole formed in the dial 30 so that an end of the pointer shaft 22 is disposed at a front side of the dial 30. A rotational base portion of the pointer 40 is coaxially connected to the end of the pointer shaft 22. The pointer 40 is rotated along a front surface of the dial 30 by the drive unit 20 while being illuminated by light emitted from the cold-cathode tube and transmitted by the light transmitting plate. As a result, the illuminated pointer 40 points a value on the illuminated scale portion 31 to indicate a speed of the vehicle. Thus, the speedometer S analog-displays a speed of the vehicle using the dial 30 and the pointer 40.

Further, as shown in to FIG. 3, the speedometer S has an EL panel 50. The EL panel 50 is disposed at a rear side of an annular holding panel 60 and at an immediately front side of the dial 30 in parallel with the dial 30. The EL panel 50 is matrix-driven to digital-display a speed of the vehicle thereon at an inner circumferential side of the scale portion 31 of the dial 30. When the EL panel 50 is turned off, the EL panel 50 becomes transparent.

The tachometer R is disposed at a left side of the speedometer S in FIG. 1. As shown in FIG. 2, the tachometer R has a drive unit 70 having a unit body 71 attached to the panel P and a pointer shaft (not shown). The pointer shaft is rotatably held by the unit body 71 and protrudes from a front surface of the unit body 71. The tachometer R has a dial 80 and a pointer 90. The dial 80 is held in the casing 10 at an immediately front side of the unit body 71. The dial 80 is formed similarly to the dial 30 of the speedometer S and is illuminated by light emitted from the cold cathode tube and transmitted by the light transmitting plate.

The pointer shaft of the drive unit 70 extends through a hole formed in the dial 80 so that an end of the pointer shaft is disposed at a front side of the dial 80. A rotational base portion of the pointer 90 is coaxially connected to the end of the pointer shaft. The pointer 90 is rotated along a front surface of the dial 80 by the drive unit 70 while being illuminated by light emitted from the cold-cathode tube and transmitted by the light transmitting plate. As a result, the illuminated pointer 80 points a value on an illuminated scale portion of the dial 90 to analog-display a rotational speed of an engine of the vehicle.

The gauge G is disposed at a right side of the speedometer S in FIG. 1. As shown in FIG. 2, The gauge G has a pair of drive units 100. Each of the drive units 100 has a unit body 101 attached to the panel P and a pointer shaft (not shown) protruding from a front surface of the unit body 101 and rotatably held by the unit body 101. The gauge G also has a dial 110 and pointers 120a, 120b. The dial 110 is held in the casing 10 at an immediately front side of the unit bodies 101.

As shown in FIG. 1, the dial 110 has an arc-shaped scale portion 111 at a left side for showing an amount of fuel in a fuel tank of the vehicle. The dial 110 also has an arc-shaped scale portion 112 at a right side for showing a temperature of engine coolant flowing through an engine cooling unit of the vehicle. Light emitted from the cold-cathode tube enters the dial 110 through the light transmitting plate so that the dial 110 is illuminated.

Each of the pointer shaft of the drive units 100 extends through a hole formed in the dial 110 so that each end of the pointer shafts is disposed at a front side of the dial 110. Each rotational base portion of the pointers 120a, 120b is coaxially connected to each end of the pointer shafts. Each of the pointers 120a, 120b is rotated along a front surface of the dial 110 by each of the drive units 100 while being illuminated by light emitted from the cold-cathode tube and transmitted by the light transmitting plate. As a result, the illuminated pointers 120a, 120b respectively points values on the illuminated scale portions 111, 112 to analog-display an amount of fuel and a temperature of engine coolant.

The warning light W is disposed below the speedometer S in FIG. 1. The warning light W has a pattern display panel 130a and a warning lamp group 130b. The pattern display panel 130a has plural display patterns to be projected such as a brake display pattern 131. The warning lamp group 130b is disposed at an immediately rear side of the pattern display panel 130a. The warning lamp group 130b includes plural lamps each of which is disposed opposite each of the display patterns of the pattern display panel 130a. For example, a brake lamp of the warning lamp group 130b, which is turned on when a parking brake of the vehicle is stepped, is disposed opposite the brake display pattern 131. As a result, when the brake lamp is turned on, the brake display pattern 131 is illuminated.

As shown in FIGS. 1–3, the holding panel 60 has an annular wall 60a and a rear wall 60b. The rear wall 60b is disposed in a rear opening 61 of the annular wall 60a and is integrally formed with the annular wall 60a. As shown in FIG. 3, a front end of the annular wall 60a is formed to be curved so that a width of the annular wall 60a in a front-rear direction becomes largest at an upper end thereof and is decreased toward a lower end thereof in FIG. 3. The annular wall 60a is attached to the casing 10 so that the rear opening 61 of the annular wall 60a is disposed opposite an opening of the casing 10 with the EL panel 50 being disposed therebetween. As a result, the rear wall 60b is disposed at an immediately front side of the EL panel 50 in parallel with the dials 30, 80 and 110.

The rear wall 60b has three openings 62 each of which is disposed opposite each of the EL panel 50 and the dials 80, 100, and an opening 63 disposed opposite the pattern display panel 130a. In the present embodiment, as shown in FIG. 3, an outer peripheral portion 62a of the rear wall 60b formed along a periphery of the opening 62 for the EL panel 50 is disposed opposite an outer peripheral portion 51 of the EL panel 50. Similarly, an outer peripheral portion 62a of the rear wall 60b formed along a periphery of the opening 62 for the dial 80/110 is disposed opposite an outer peripheral portion of the dial 80/110.

Still referring to FIG. 3, the front panel 140 is attached to the annular wall 60a to cover a front opening (i.e., right end opening in FIG. 3) of the annular wall 60a. The front panel 140 has a frame 141 and a "black-face" smoke glass 142 fitted into the frame 141. A translucent rate of the smoke glass 142 is set to approximately 25%, for example, so that the dial 30 is not seen through the smoke glass 142 when the cold-cathode tube is turned off.

Figure 4:
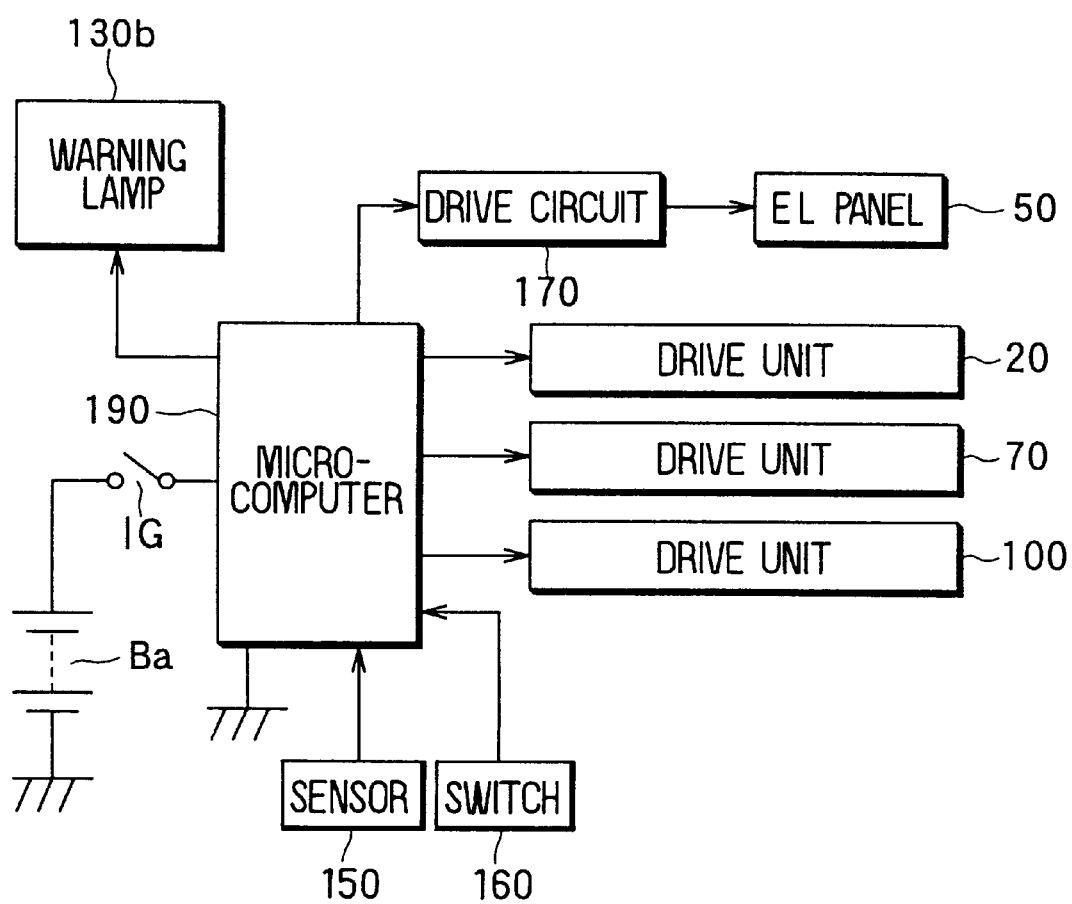
FIG. 4 is a block diagram showing a control system of the combination meter according to the embodiment.

Next, a control system of the combination meter will be described with reference to FIG. 4. A sensor group 150 includes plural sensors and detects a speed of the vehicle, a rotation speed of the engine, a temperature of engine coolant and an amount of fuel in the fuel tank. An analog-digital switch 160 is for switching among analog display of the speedometer S by the dial 30, digital display of the speedometer S by the EL panel 50 and analog-and-digital display of the speedometer S by the dial 30 and the EL panel 50. The analog-digital switch 160 is set to either a first, second or third position. In the present embodiment, when the analog-digital switch 160 is set to the first position, the speedometer S analog-and-digitally-displays a speed of the vehicle. When the analog-digital switch 160 is set to the second position, the speedometer S digital-displays a speed of the vehicle. When the analog-digital switch 160 is set to the third position, the speedometer S analog-displays a speed of the vehicle.

A micro-computer 190 executes a computer program according to a flow chart (not shown) for controlling the combination meter. During the program, at least one of the cold-cathode tube, the drive units 20, 70 and 100 and an EL drive circuit 170 for driving the EL panel 50 is driven according to detection output of the sensor group 150 and a set position of the analog-digital switch 160. Further, the warning light W outputs a warning, and if any abnormality of the gauge G and the warning light W is detected, the abnormality is corrected. As shown in FIG. 2, the EL drive circuit 170 is connected to the EL panel 50 through a flexible print-circuit board 180a. The EL drive circuit 170 is accommodated in a circuit casing 180, which is mounted on an upper surface of the annular wall 60a.

While the micro-computer 190 executes the program, the drive unit 20 rotates the pointer 40 according to a speed of the vehicle detected by the sensor group 150. The drive unit 70 rotates the pointer 90 according to a rotation speed of the engine detected by the sensor group 150. The drive units 100 respectively rotate the pointers 120a, 120b according to an amount of fuel in the fuel tank and a temperature of engine coolant detected by the sensor group 150.

When the analog-digital switch 160 is set to either the first or third position, the cold-cathode tube is turned on. When the analog-digital switch 160 is set to either the first or second position, the EL drive circuit 170 matrix-drives the EL panel 50 so that a speed of the vehicle is digital-displayed on the El panel 50. When the switch 160 is set to the third position, the EL drive circuit 170 makes the EL panel 50 transparent. Further, a corresponding lamp in the warning lamp group 130 is turned on according to various operation of the vehicle such as operation of the parking brake.

According to the present embodiment, the EL panel 50 is attached to the rear wall 60b of the holding panel 60 to be exposed through the opening 62 of the rear wall 60b, and the EL drive circuit 170 accommodated in the circuit casing 180 is mounted on an upper surface of the annular wall 60a of the holding panel 60. Therefore, the EL drive circuit 170 and the EL panel 50 are readily attached to the casing 10 simultaneously when the holding panel 60 is attached to the casing 10. As a result, an efficiency in attachment of the holding panel 60, the EL panel 50, the EL drive circuit 170 to the casing 10 is improved. The circuit casing 180 is attached to the annular wall 60a by a fastening member such as a screw or a claw integrally formed on the circuit casing 180.

Further, in the present embodiment, the annular wall 60a is formed to curve as shown in FIG. 3 to have a largest width in a front-rear direction at an upper end thereof. The EL drive circuit 170 accommodated in the circuit casing 180 is mounted on the relatively wide upper surface of the annular wall 60a. Therefore, the EL drive circuit 170 is efficiently attached to the casing 10 while making good use of a shape of the holding panel 60, thereby restricting a mounting space of the combination meter in the vehicle from largely increasing. Also, the EL drive circuit 170 and the EL panel 50 are readily replaced by detaching the holding panel 60 from the casing 10. Therefore, an efficiency in replacement of the EL drive circuit 170 and the EL panel 50 is improved.

Moreover, since the outer peripheral portion of the EL panel 50 is disposed opposite the outer peripheral portion 62a of the rear wall 60b formed along the periphery of the opening 62, the outer peripheral portion of the EL panel 50 is concealed by the outer peripheral portion 62a when viewed from a front side of the EL panel 50. The outer peripheral portion of the dial 30 is also concealed by the outer peripheral portion 62a. Therefore, when the EL panel 50 is viewed by the driver through the front panel 140, the outer peripheral portions of the EL panel 50 and the dial 30 are not seen by the driver. Therefore, when wiring of the speedometer S is disposed in the outer peripheral portions of the EL panel 50 and the dial 30, the wiring can be concealed. Similarly, wiring of the tachometer R and the gauge G can be concealed when disposed in the outer peripheral portions of the dials 80, 110.

Figure 5:
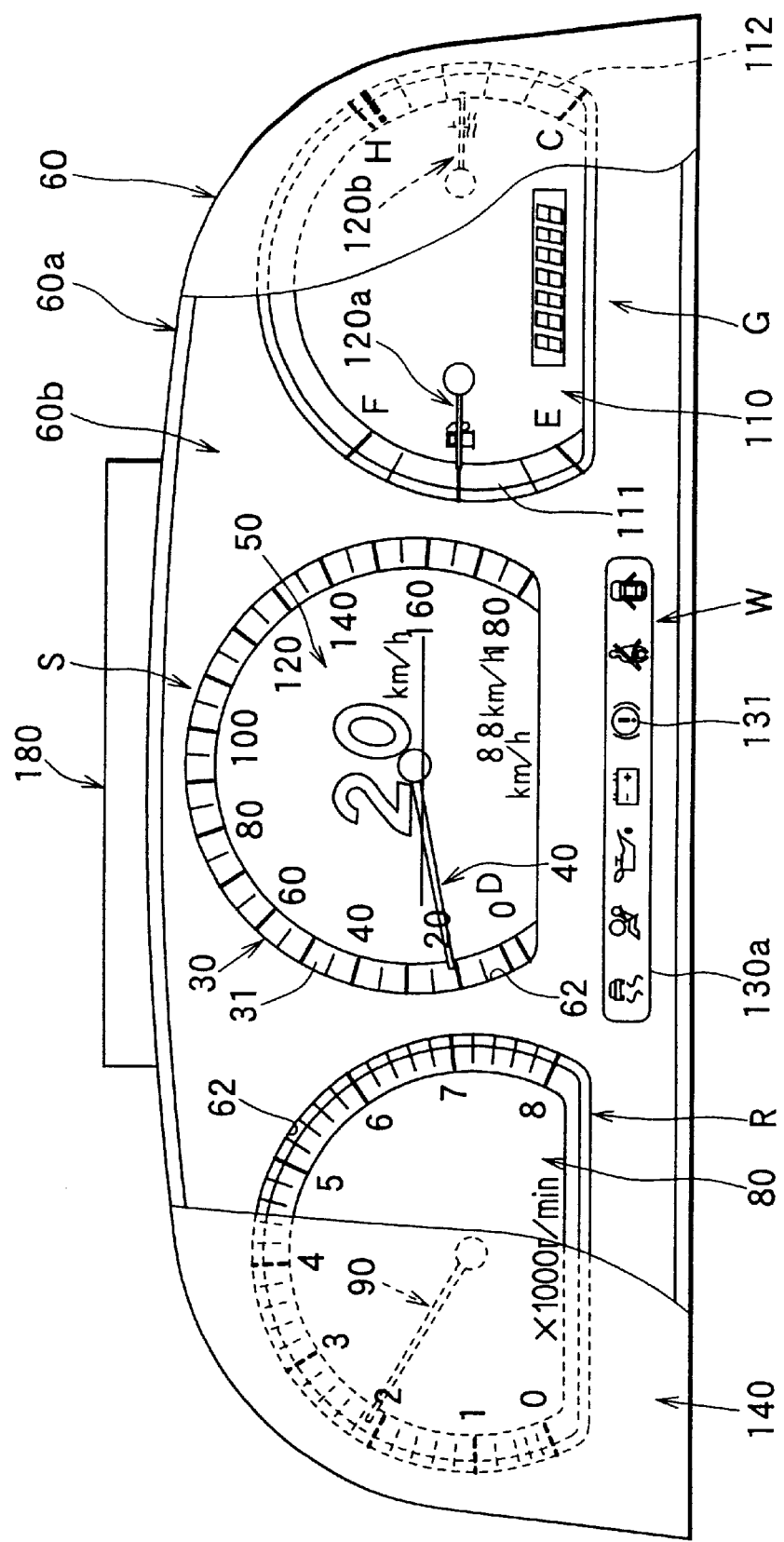
FIG. 5 is a cutaway front view showing the combination meter in which a speedometer analog-and-digital-displays a speed of the vehicle according to the embodiment.

In FIG. 5, the analog-digital switch 160 is set to the first position. As a result, the cold-cathode tube is turned on, and the dial 30 and the pointer 40 are illuminated by light emitted from the cold-cathode tube and transmitted by the light transmitting panel. The pointer 40 is rotated by the drive unit 20 along the front surface of the dial 30 to analog-display a speed of the vehicle. At the same time, the EL panel 50 is matrix-driven by the EL drive circuit 170 to digital-display a speed of the vehicle at an inner circumferential side of the scale portion 31 of the dial 30.

Figure 6:
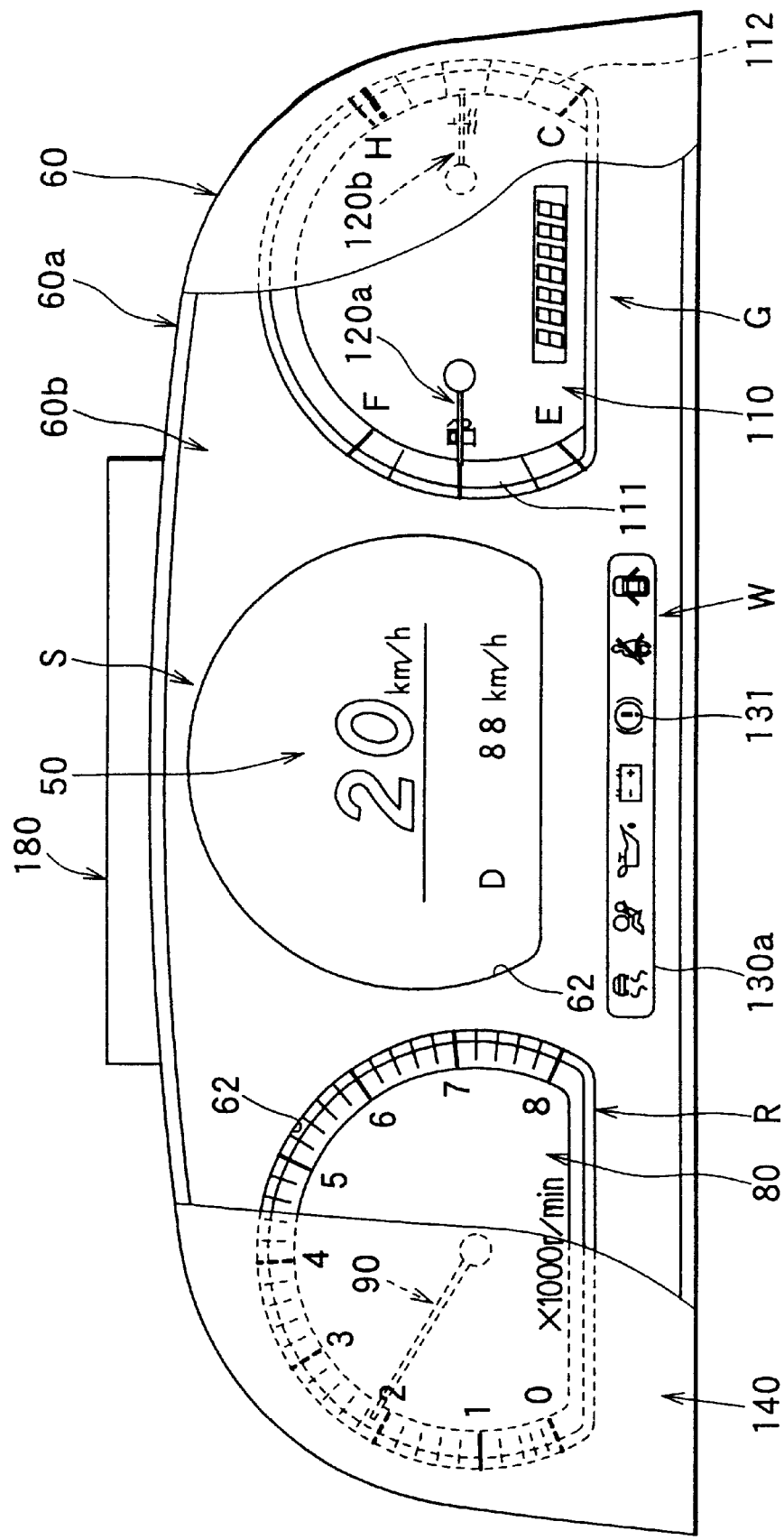
FIG. 6 is a cutaway front view showing the combination meter in which the speedometer digital-displays a speed of the vehicle according to the embodiment.

In FIG. 6, the analog-digital switch 160 is set to the second position. As a result, the cold-cathode tube is turned off, and the dial 30 and the pointer 40 becomes invisible. At the same time, the EL panel 50 is matrix-driven by the EL drive circuit 170 to digital-display a speed of the vehicle.

Figure 7:
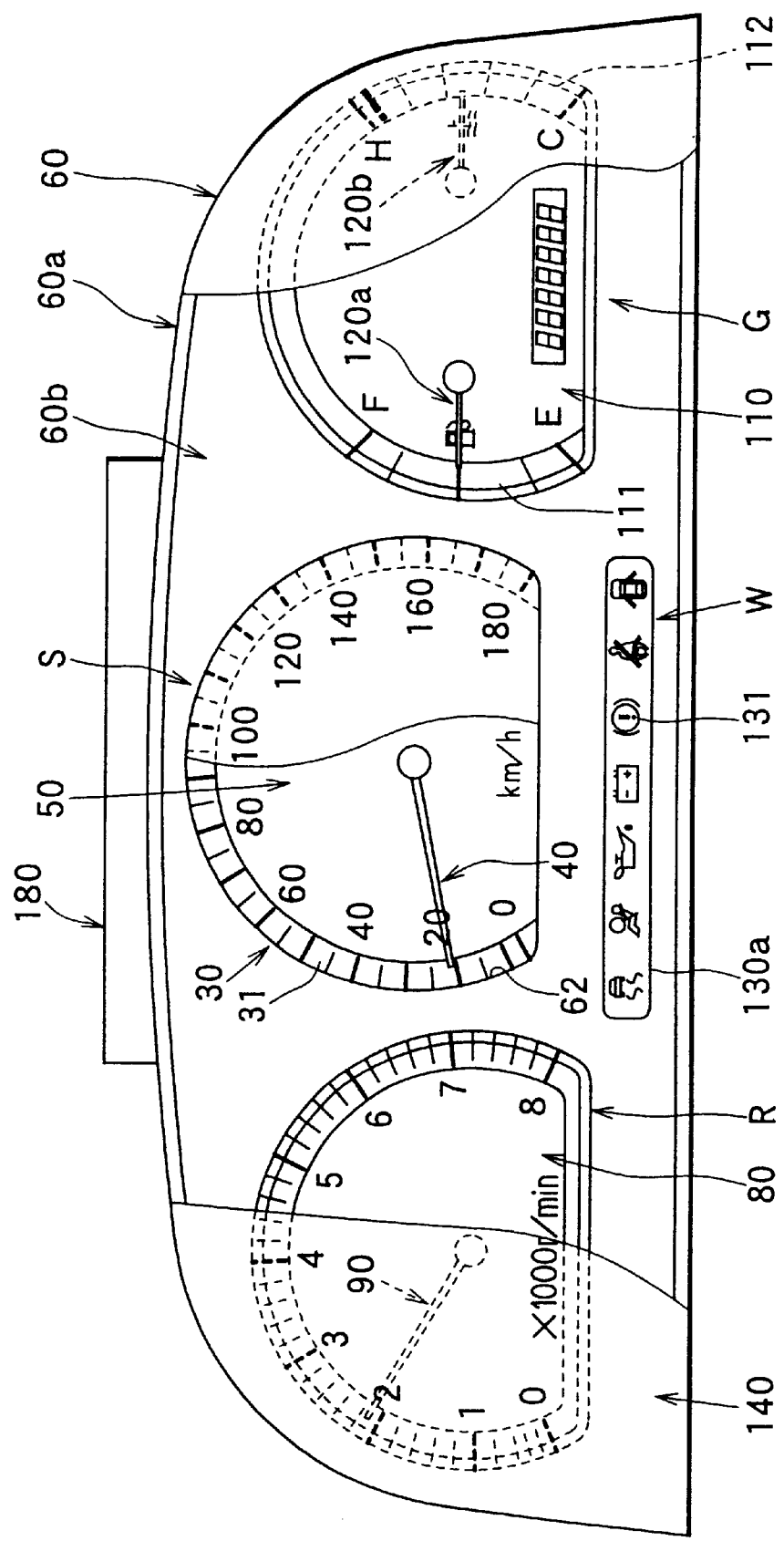
FIG. 7 is a cutaway front view showing the combination meter in which the speedometer analog-displays a speed of the vehicle according to the embodiment.

In FIG. 7, the analog-digital switch 160 is set to the third position. As a result, the cold-cathode tube is turned on and the EL panel 50 becomes transparent. The dial 30 and the pointer 40 are illuminated by light emitted from the cold-cathode tube and transmitted by the light-transmitting plate. The pointer 40 is rotated by the drive unit 20 along the front surface of the dial 30 to analog-display a speed of the vehicle.

Figure 8:
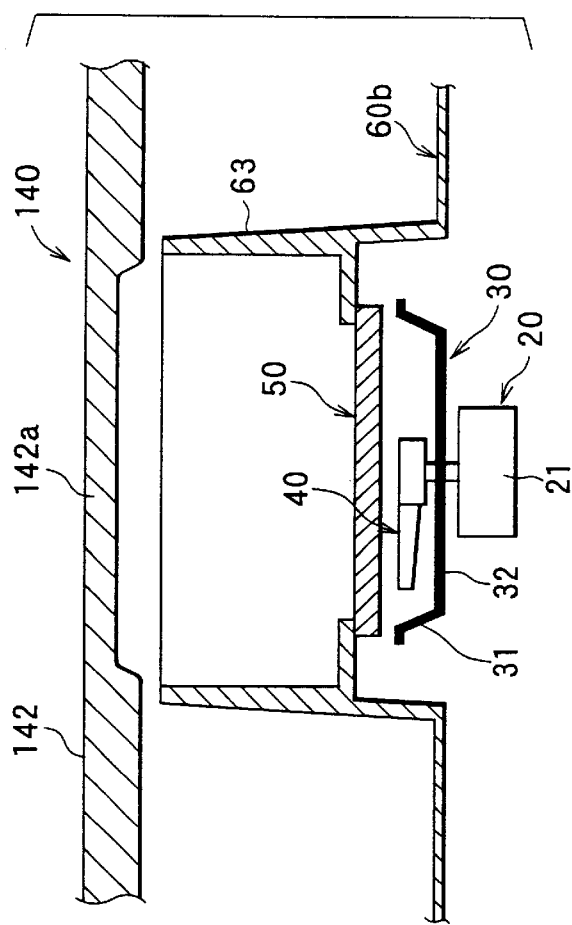
FIG. 8 is a partially sectional view showing a part of a combination meter for a vehicle according to a modification of the embodiment.

A first modification of the present embodiment will be described with reference to FIG. 8. As shown in FIG. 8, the smoke glass 142 of the front panel 140 has a thinned portion 142a having a decreased thickness and disposed opposite the EL panel 50. Further, the rear wall 60b has a cylindrical portion 63. The cylindrical portion 63 is integrally formed with the rear wall 60b to coaxially surround the EL panel 50, the pointer 40 and the dial 30. The cylindrical portion 63 is disposed opposite the thinned portion 142a.

According to the first modification of the embodiment, even when a translucent rate of the EL panel 50 is relatively low, a brightness of the dial 30, the pointer 40 and the El panel 50 through the smoke glass 142 is increased due to the thinned portion 142a. As a result, a difference between a brightness of the dial 30, the pointer 40 and the EL panel 50 through the thinned portion 142a and a brightness of the dials 80, 110 through the smoke glass 142 is eliminated. Further, an end of the cylindrical portion 63 is disposed opposite a step portion of the smoke glass 142 formed along a periphery of the thinned portion 142a. Therefore, the step portion is restricted from being prominent when viewed from a front side of the front panel 140.

Figure 9:
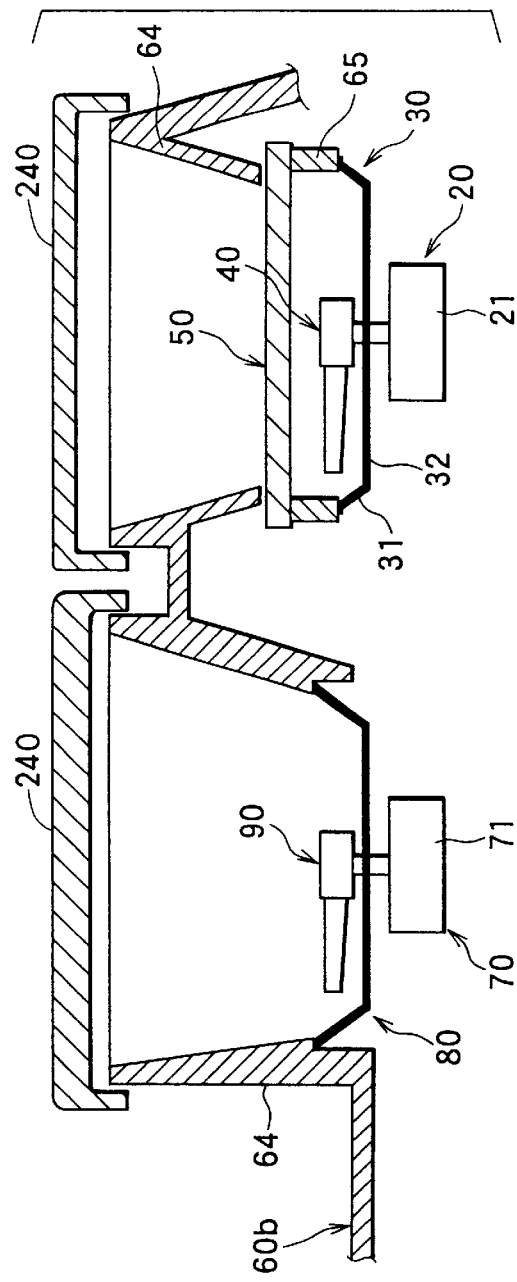
FIG. 9 is a partially sectional view showing a part of another combination meter for a vehicle according to a modification of the embodiment.

A second modification of the present embodiment will be described with reference to FIG. 9. As shown in FIG. 9, three front panels 240 are used instead of the front panel 140. A thickness of the front panel 240 for the EL panel 50 is set larger than those of the front panels 240 for the dials 80, 110. In FIG. 9, only the front panels 240 for the EL panel 50 and the dial 80 are shown. Further, the rear wall 60b has three tapered cylindrical portions 64 each of which is disposed opposite each of the front panels 240. An annular shielding wall 65 is disposed between the EL panel 50 and the dial 30. According to the second modification of the embodiment, the same effect as in the first modification is obtained.

The present invention is not limited to the combination meter for the vehicle, but may be applied to any composite operational display unit for a ship or a general industrial device. The present invention may be applied to a single speedometer S instead of a composite display unit. Further, any other display panel such as a liquid crystal panel, which is turned on to conduct matrix display and is turned off to become transparent, may be used in stead of the EL panel 50.

The EL panel 50 may not be matrix-driven, but may have plural seven-segment electrode patterns. Further, the speedometer S which analog-displays a speed of the vehicle may be replaced with a liquid crystal panel, an EL panel or a vacuum fluorescent display (VFD) panel which digital-displays a speed of the vehicle.

While a speed of the vehicle is analog-displayed by the dial 30 and the pointer 40, the EL panel 50 may digital-display a speed of the vehicle in a part of or a whole area of the EL panel 50. In this case, a speed of the vehicle is preferably digital-displayed not to interfere the scale pattern 31 of the dial 30. This is effective especially when the EL panel 50 is applied with diffusion treatment on both sides thereof to restrict noise image from being generated when the EL panel 50 is turned on. The noise image includes reflection image generated by glass of front and rear surfaces of the dial 30.

Further, the EL panel 50 may be also disposed opposite the dials 80, 110. Also, when the annular wall 60a is curved in an opposite direction to that in FIG. 3, a mounting position of the circuit casing 180 is changed correspondingly, that is, the circuit casing 180 is mounted on a lower end surface of the annular wall 60a.

Although the present invention has been fully described in connection with a preferred embodiment thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A composite operational display unit comprising:
   a first operational display;
   a second operational display disposed at a front side of the first operational display;
   an annular holding panel having a rear opening, the holding panel being attached to the second operational display from a front side of the second operational display so that the second operational display is disposed opposite the rear opening; and
   a drive unit which drives the second operational display, the drive unit being mounted on an outer surface of the holding panel, wherein:
   the first operational display is visible through the second operational display.

2. The composite operational display unit according to claim 1, further comprising:
   a front panel attached to the holding panel from a front side of the holding panel, wherein:
   the holding panel has a front end forming a front opening, the front end being formed to extend obliquely with respect to the rear opening of the holding panel so that the holding panel has a larger-width portion having a larger width in a front-rear direction;
   the front panel is disposed opposite the front opening of the holding panel to face the rear opening of the holding panel; and
   the drive unit is mounted on an outer surface of the larger-width portion.

3. A composite operational display unit comprising:
   a casing having an opening;
   a first operational display disposed in the casing;
   a second operational display disposed in the casing at a front side of the first operational display;
   an annular holding panel having a rear opening, the holding panel being attached to the casing so that the rear opening of the holding panel is disposed opposite the opening of the case, and that the first and second operational displays are disposed between the casing and the holding panel; and
   a drive unit which drives the second operational display, the drive unit being mounted on an outer surface of the holding panel, wherein:
   the first operational display is visible through the second operational display.

4. The composite operational display unit according to claim 3, wherein:
   the first operational display includes a plurality of display portions; and
   the second operational display is disposed at a front side of at least one of the display portions.

5. The composite operational display unit according to claim 3, further comprising:
   a front panel attached to the holding panel from a front side of the holding panel, wherein:
   the holding panel has a front end forming a front opening, the front end being formed to extend obliquely with respect to the rear opening of the holding panel so that the holding panel has a larger-width portion having a larger width in a front-rear direction;
   the front panel is disposed opposite the front opening of the holding panel to face the rear opening of the holding panel; and
   the drive unit is mounted on an outer surface of the larger-width portion.

6. The composite operational display unit according to claim 5, further comprising a lamp for illuminating the first operational display, wherein:
   the first operational display is visible through the front panel when the lamp is turned on for illuminating the first operational display; and
   the first operational display is invisible through the front panel when the lamp is turned off.

7. The composite operational display unit according to claim 5, wherein the front panel has a translucent rate of approximately 25%.

8. The composite operational display unit according to claim 5, wherein the front panel is made of smoke glass.

9. The composite operational display unit according to claim 1, wherein each of outer peripheral portions of the first and second operational displays is concealed by an outer peripheral portion formed along a periphery of the rear opening of the holding panel to be invisible from a front side of the first and second operational displays.

10. The composite operational display unit according to claim 2, wherein:
    the front panel has a thinned portion having a smaller thickness;
    the thinned portion is disposed opposite the second operational panel.

11. The composite operational display unit according to claim 1, wherein the second operational display is an electroluminescent display.

12. A method of manufacturing a composite operational display unit comprising steps of:

attaching a second operational display to an annular holding panel so that the second operational display is disposed opposite a rear opening of the holding panel;

mounting a drive unit which drives the second operational display on an outer surface of the holding panel; and attaching the holding panel connected with the second operational display and the drive unit to a casing having an opening and accommodating a first operational display therein, so that the rear opening of the holding panel is disposed opposite the opening of the casing, and that the first and second operational displays are disposed between the casing and the holding panel.

* * * * *